Patented Feb. 6, 1945

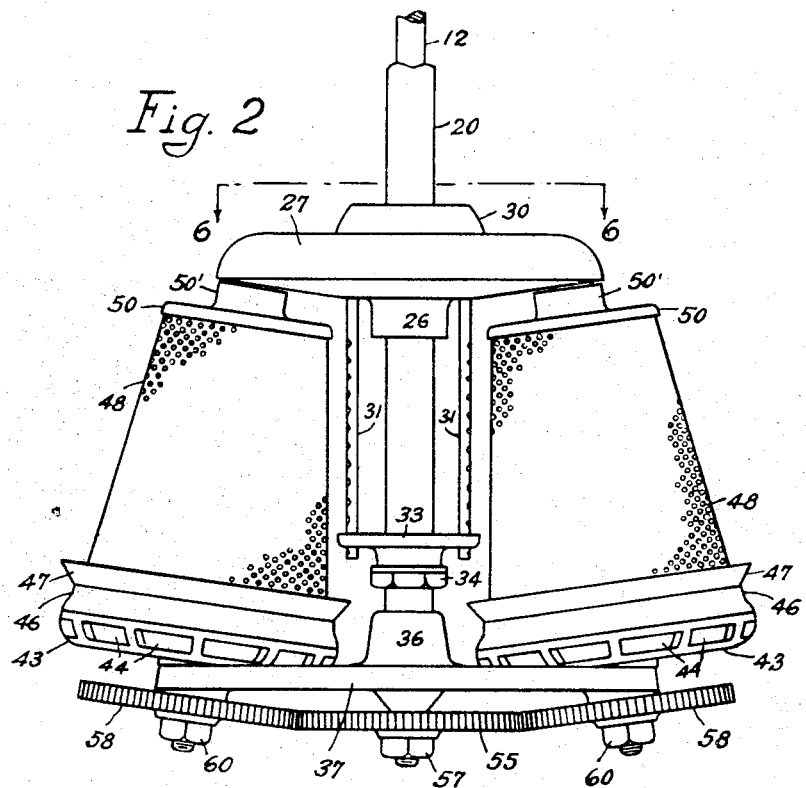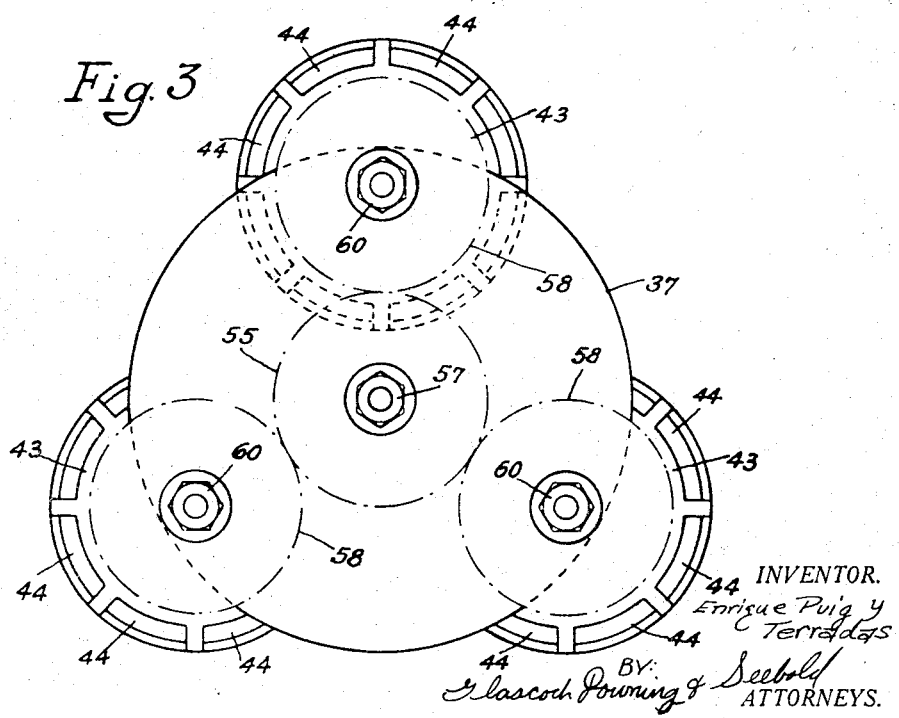

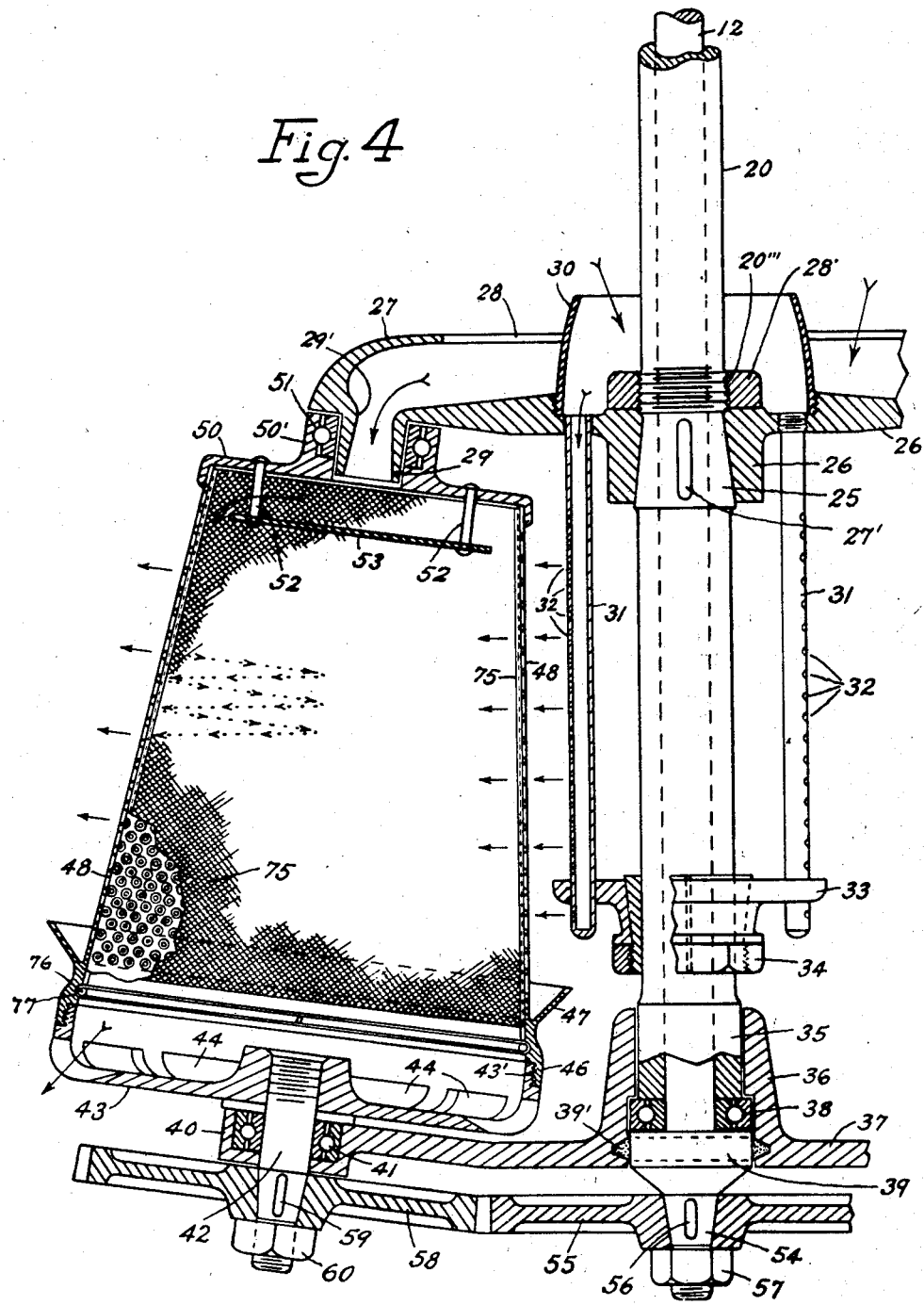

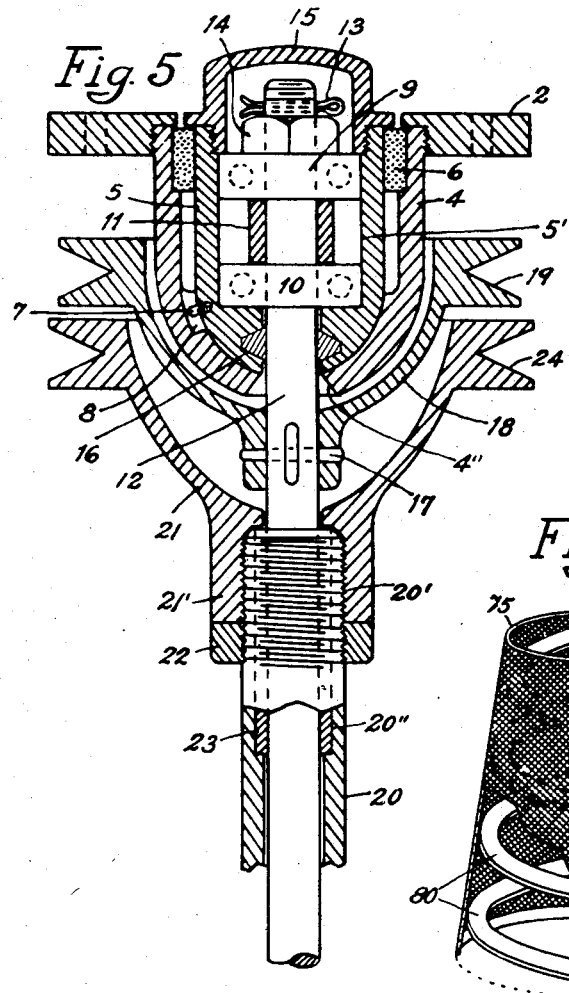

2,368,876

UNITED STATES PATENT OFFICE 2,368,876

CONTINUOUS CENTRIFUGAL SEPARATOR

Enrique Puig y Terradas, Central Algodones, Cuba

Application July 26, 1941, Serial No. 404,247
In Cuba July 17, 1941

2 Claims. (Cl. 210—68)

This invention refers to a continuous centrifugal separator, which though mainly applicable to the separation of molasses from sugar (purging), is suitable for the separation of solids from liquids in general, such as cane sugar juice syrups, petroleum, gasoline, oils, fruit juices, waters, etc.; and has for its principal object to provide a device that by the application of centrifugal force, transmitted to filtering means or baskets placed in substantially inclined position, allows solid or suspended particles to slide downward over the filtering mesh during the gyration of the respective filter body, in successive adhesions and slippings of the particles to and from the mesh or filtering screen, as such particles descend toward the discharge opening of the baskets.

In the drawings:

Fig. 2 is a detailed elevation of the filtering devices or baskets forming part of the device;

Fig. 3 is a plan view taken on the lower part of Fig. 2;

Fig. 4 is a partial section, to enlarged scale, showing the mounting of one of the filtering bodies or baskets;

Fig. 5 is a detailed vertical section, taken through the center, along the line 5—5 of Fig. 1;

Fig. 6 is a partial horizontal section, in detail, along the line 6—6 of Fig. 2;

Fig. 7 is a fragmentary, detailed, perspective view of the upper portion of one of the filter sections;

Fig. 8 is a detailed sectional view, to an enlarged scale, of the lower portion of one of the filtering baskets;

Fig. 9 is a detailed perspective view, partially cut away, of one of the filtering elements equipped with filter mesh; and, Fig. 10 is a detailed perspective view of a filter body showing a modified form thereof.

Figure 1:
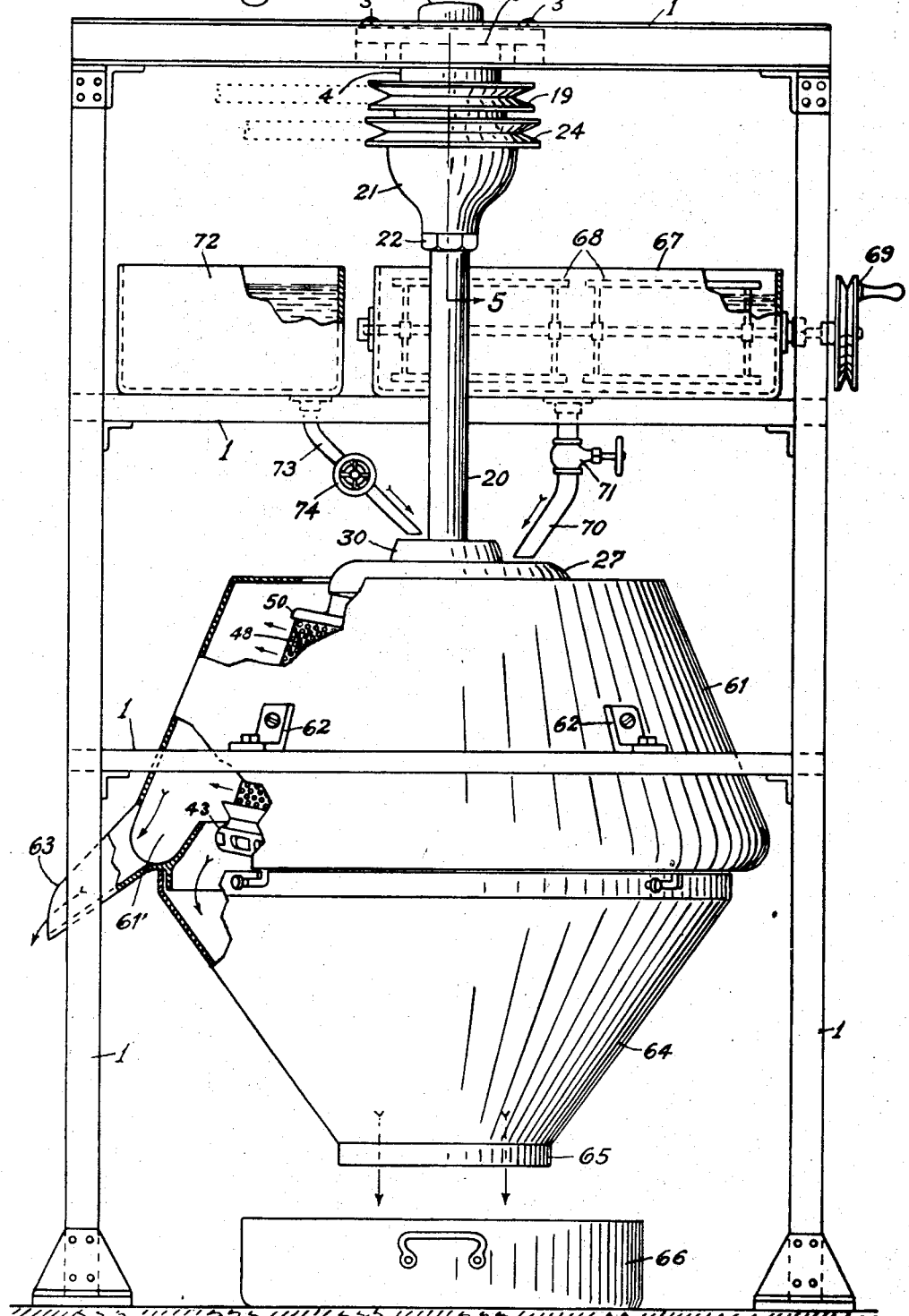
Fig. 1 is an elevation of the device that is the subject matter of the present invention.

Reference to the above mentioned figures and, chiefly, to Fig. 1, discloses that 1 is a frame on the upper part whereof is suspendedly sustained by means of bolts 3 a supporting plate 2 to which is screwed on its upper part a member 4 having the shape of an inverted bell, the interior portion of which is spherical. Within piece 4 is fitted the lower spherical part of another member, also affecting the form of an inverted bell, 5, mounted for oscillatory movement by means of a universal joint, a dampening ring 6 being interposed between both members, the oscillatory movement whereof, that is, of 4 and 5, being limited with respect to each other by a stop-screw 7 fitting into a recess 8 of bell 4.

The lower part of member 5 has a counterbored seat 5' serving to receive in spaced relation ball bearings 9 and 10 between which is interposed bushing 11 through which slides vertical shaft 12 secured at its extended upper end to ball bearing 9 by means of cotter-pin 13 and nut 14, all being covered over by a flanged cover 15 screwed to the internally threaded upper part of the bell-shaped member 5.

Numeral 16 designates a packing ring next to a conical opening 4'' in the lower portion of bell-shaped member 4.

To shaft 12 is secured by means of a pin 17 a bell-shaped support or inverted receptacle 18 an integral part of which is a V-shaped pulley 19, rotated by a source of power not illustrated.

Shaft 12 is arranged within a tubular shaft 20 which, at its upper part 20' is threaded to receive the internally threaded throat of another inverted bell-shaped member 21 secured by jam nut 22, said member 21 being integral with another V-shaped pulley 24 likewise receiving power from the same source (not shown) as pulley 19.

A spaced relation is maintained between shaft 12 and shaft 20 by means of a bushing 23 which, as shown in Fig. 5, is lodged in a seated counterbore 20'' interiorly of tubular shaft 20.

In its middle portion tubular shaft 20 has a conical enlargement or skirt 25 fitted with a bushing 26 secured thereto by a key fitting into key-seat 27 and by the jam-nut 28' threaded onto the threaded portion 20''' of shaft 20. The bushing 26 extends outwardly to form the bottom 26' of a distributor head provided with cover 27 which in its upper part shows inlet openings 28 and in its lower part necks 29 downwardly directed. To bottom 26' is threaded a hopper 30, the mouth whereof is slightly constricted, and the part of this bottom corresponding to hopper 30 is provided with apertures to which are secured the upper extremities of the branches of downtake tubes 31 provided with discharge openings 32 throughout their entire length and which, at their lower extremities, are secured to a supporting flange 33 secured to shaft 20 by jam-nut 34.

The lower end of shaft 20 is enlarged as at 35 and has loosely mounted thereon an internally shouldered bushing 36 forming an integral central part of a dished supporting plate 37 while the shoulder of the bushing 36 and the lower extremity of shaft 20 rest on a ball-bearing 38 which in turn rests on a collar 39 on the lower end of shaft 12 and around which is fitted packing ring 39'. Near its inclined outer edge supporting plate 37 is formed with an enlargement 40, there being three in the case illustrated.

Each enlargement 40 is provided with a ball-bearing 41 to receive a short vertical shaft 42, in each one, each of which short shafts is secured to the bottom 43 of a filter basket or filtering device body, said bottom having discharge openings 44 and showing its rim 43' to be raised, constituting a peripheral flange, outwardly threaded, suitable for receiving a threaded rim 46 upwardly terminating in an annular canal 47 into which is integrally formed a strainer body or filtering basket 48, of conical form in the example illustrated, but which can be cylindrical, and built of perforated sheet, which member, due to the inclination already mentioned of supporting plate 37, is in an inclined position relative to shafts 12 and 20, as may be clearly seen by reference to Figs. 2 and 4.

Openings 49 in the filtering plate or strainer 48, as shown in Figs. 4 and 8, are countersunk to smaller diameters on the outside than on the inside face of said plate.

Upwardly the aforesaid strainer body (three in the case illustrated) is closed by a flanged lid or top 50 having a centrally located opening 50' said opening having in its interior a counterbore or seat suitable for lodging a ball-bearing 51 and rotatably mounted within said opening are extensions 29 which on their outer faces exhibit a recession 29'.

To top or lid 50 are secured hangers 52 which hold in suspension deflecting plate 53 the object whereof shall later be explained.

Returning to shaft 12 its lower end projecting past collar 39 terminates in a spindle 54 to which is affixed a gear wheel 55 by means of keying means 56 and jam-nut 57. Wheel 55 meshes planetarily with gear wheels 58 secured by keys 59 and jam-nuts 60 to the projecting lower end of respective shaft 42, so as to provide motion for each of the filtration baskets 48.

The nest of filtering baskets is lodged in a trunco-conical curb 61 secured by angles 62 to cross members of frame 1. Said curb exhibits its lower skirt bent inwardly thus forming a canal 61' which is connected with a discharge opening extending into an inclined spout 63, directed downwardly.

Numeral 64 shows a receptacle for collecting non-filtrated material this receptacle being of trunco-conical shape and, as shown in Fig. 1, terminates in a discharge opening or mouth, 65 discharging into a receiver 66.

Numeral 67 designates a feed tank for the liquid or material to be treated, provided interiorly with an agitating mechanism of any suitable design 68 driven through transmission 69, or by other suitable means; this tank connecting through its bottom with a branch of downtake tube 70 provided with a valve 71 and discharging over and into apertures 28 of lid or cover 27.

Numeral 72 indicates another feed tank to hold a cleaning liquid said tank being provided in its bottom with an opening and a length of discharge pipe 73 and valve 74 discharging into hopper 30.

As shown by Figs. 7 and 8 to the body of perforated sheet strainer 48 is removably attached conical strainer 75 made up of metallic cloth of suitable mesh fineness according to material to be treated and which is secured to body 48 by a pressure ring 76 seating on an annular throat 77 adjacent rim 46 also formed in its inside face, as shown by Figs. 4 and 8. As shown in Fig. 9 to the filter or strainer body 48 may be attached a filter cloth 78 laid, in turn, over a perforated metal strainer 79, both members being held to body 48 by means of ring 76, as in the case previously explained.

Fig. 10 shows a variation of the filtering body, for the purpose of providing a guide to the movement of the solid particles during the operation of the device, as shall later be explained. For this purpose a strap iron member 80, rolled up in the form of a coil, is attached interiorly of the filter body or basket.

The operation of this device is as hereinbelow explained:

Upon transmitting motion to pulleys 19 and 24 these shall rotate with them shafts 12 and 20, which are thus provided with a revolving motion one independent of the other, and this, due to the meshing of gear 55 with planetary gears 58 secured to corresponding shaft 42, shall cause the revolving of the three filtration baskets (which is the number illustrated in the present case), while due to the fact that the distributor head 26' is fixed to the tubular shaft 12 it will cause rotation of the supporting plate 37 by reason of necks 29 and stub shafts 42, the bearings 51, 41 and 38 serving to reduce friction during this transmission of movement. The material to be treated from tank 67 shall be discharged by and through pipe 70 valve 71 whereof is kept open, thus falling through apertures 28 toward throats 29 and striking the suspended deflecting plate 53, and upon impinging thereon the falling material is thrown against the walls of the basket, at a point below said plate, as indicated by the arrow in Fig. 4. Centrifugal force will act to keep the suspended particles or solids hugging the filtering cloth or screen, but due to the inclined position of each basket and to the rotating motion thereof, such particles shall follow a trajectory such as indicated by the arrows in said Fig. 4, during their descent. Evidently this provides a much greater filtering area than in other known devices and, in addition, provides the continuous action of the centrifugal separator. The arrangement illustrated in Fig. 10 can be utilized, in certain cases, so that spiral 80 may function as a guide for the particles in their descent.

Solid material finally discharges through openings 44 toward receptacle 64, and aided by the inclination of the walls thereof falls and is collected in receiver or collector 66. The liquid filtering through the cloth or filtering screen of the filtration baskets falls into canal 61' and is discharged through and by the inclined spout 63.

Whenever the screens have to be cleaned a cleaning liquid is fed, and this may be either juice or already treated liquid, from tank 72 through pipe 73, holding valve 74 in open position, and discharging it into hopper 30 where it shall be distributed by perforated depending tubes 31 and shall act from outside toward the inside as shown by the arrows in Fig. 4, impinging upon the cloth or screens of the baskets.

It is evident that within the principles above disclosed certain changes may be made without departing from the fundamental idea of the invention; among others, it is possible to vary the form of the filtration baskets, using cylindrical instead of conical ones; the power transmission could be effected from below instead of from above; it is also possible to vary the form or manner of feeding the material; all of it as required by the working conditions and the kind of material to be processed; so that I do not limit myself to the foregoing description, but pray that the patent protect that which is embraced under and by the following claims.

I claim:

1. A centrifugal separator comprising a frame, a vertically disposed main shaft having its upper end removably suspended for rotary and limited universal movement from the top of the frame, a tubular shaft telescoped thereabout, means on the lower end of the main shaft for rotatably supporting the tubular shaft thereon, means associated with the upper end of both of said shafts for effecting the independent rotation thereof, a carrier loosely disposed about the lower end of the tubular shaft and also rotatably supported adjacent the lower end of the main shaft including a disc-like supporting plate the outer portion of which is inclined upwardly, a feeding distributor head arranged above the top of the carrier and fixed to the tubular shaft to rotate therewith and including a series of downwardly inclined outlet necks, a series of baskets each including a bottom provided with openings, stub shafts extending perpendicularly from the bottoms and journaled in the inclined portions of the supporting plate so that all of the baskets are arranged at an inclination to the vertical and toward each other, tops for the baskets each having central apertures and bearings about the apertures for rotatable engagement with the adjacent outlet necks in the distributor head in such manner that when the tubular shaft and distributor head are rotated the baskets are caused to travel in a circular path with the supporting plate, a main gear fixed to the lower end of the main shaft beneath the supporting plate and other gears arranged on the lower projecting ends of the stub shafts and meshing with the main gear so that rotary motion will be transmitted to each of the baskets as they are moved in the circular path, and a housing mounted on the supporting frame and arranged about the carrier and provided with means for receiving and discharging the filtrate and for separately discharging the residue.

2. A centrifugal separator as claimed in claim 1, in which a separate hopper for cleaning fluid is situated centrally of and removably fixed to the distributor head and a series of pipes depending from the hopper and in communication therewith are situated adjacent the walls of the basket and have the outer portions perforated substantially as and for the purposes set forth.

ENRIQUE PUIG Y TERRADAS.